United States Patent
Schaver

(10) Patent No.: US 7,653,822 B2
(45) Date of Patent: Jan. 26, 2010

(54) ENTRY INTO A LOW POWER MODE UPON APPLICATION OF POWER AT A PROCESSING DEVICE

(75) Inventor: Jeffrey S. Schaver, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 434 days.

(21) Appl. No.: 11/377,993

(22) Filed: Mar. 17, 2006

(65) Prior Publication Data
US 2007/0220281 A1 Sep. 20, 2007

(51) Int. Cl.
G06F 1/32 (2006.01)

(52) U.S. Cl. .................. 713/300; 713/310; 713/600; 713/601

(58) Field of Classification Search ......... 713/300–375, 713/600, 601
See application file for complete search history.

(56) References Cited

U.S. PATENT DOCUMENTS

| 4,381,552 A | 4/1983 | Nocilini et al. |
| 5,025,387 A | 6/1991 | Frane |
| 6,816,976 B2 * | 11/2004 | Wright et al. ............... 713/323 |
| 2003/0009617 A1 * | 1/2003 | Cohen ....................... 711/105 |
| 2003/0056127 A1 * | 3/2003 | Vaglica ....................... 713/300 |
| 2003/0097598 A1 * | 5/2003 | Aklilu et al. ................. 713/300 |
| 2005/0160301 A1 * | 7/2005 | Disser ........................ 713/310 |

* cited by examiner

Primary Examiner—Thomas Lee
Assistant Examiner—Paul B Yanchus, III

(57) ABSTRACT

A processing device asynchronously enters a first mode in response to an application of power at the processing device. The processing device receives a wake signal at the processing device subsequent to entering the first mode. The processing device asynchronously enters a second mode from the first power mode in response to receiving the wake signal. A clock at the processing device is disabled in the first mode and enabled in the second mode.

18 Claims, 3 Drawing Sheets

ENTRY INTO A LOW POWER MODE UPON APPLICATION OF POWER AT A PROCESSING DEVICE

FIELD OF THE DISCLOSURE

The present disclosure is related generally to power management in processing devices and more specifically to controlling the operation of processing devices upon application of power.

BACKGROUND

The application of power to a processing device, such as by actuating a button or switch, typically results in contact bounce whereby the voltage input to the processing device fluctuates and eventually settles to a fixed voltage. This contact bounce typically results in intermittent operation of internal clocks and other components of the processing device until the voltage settles, thereby unnecessarily dissipating power and often resulting in spurious operation of the processing device.

Power dissipation also is a concern in systems utilizing multiple processing devices. In certain instances, the power supply may be unable to provide sufficient power in the event that a large number of the processing devices are in an operational mode simultaneously. Accordingly, an improved technique for processing device operation subsequent to a power application event would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
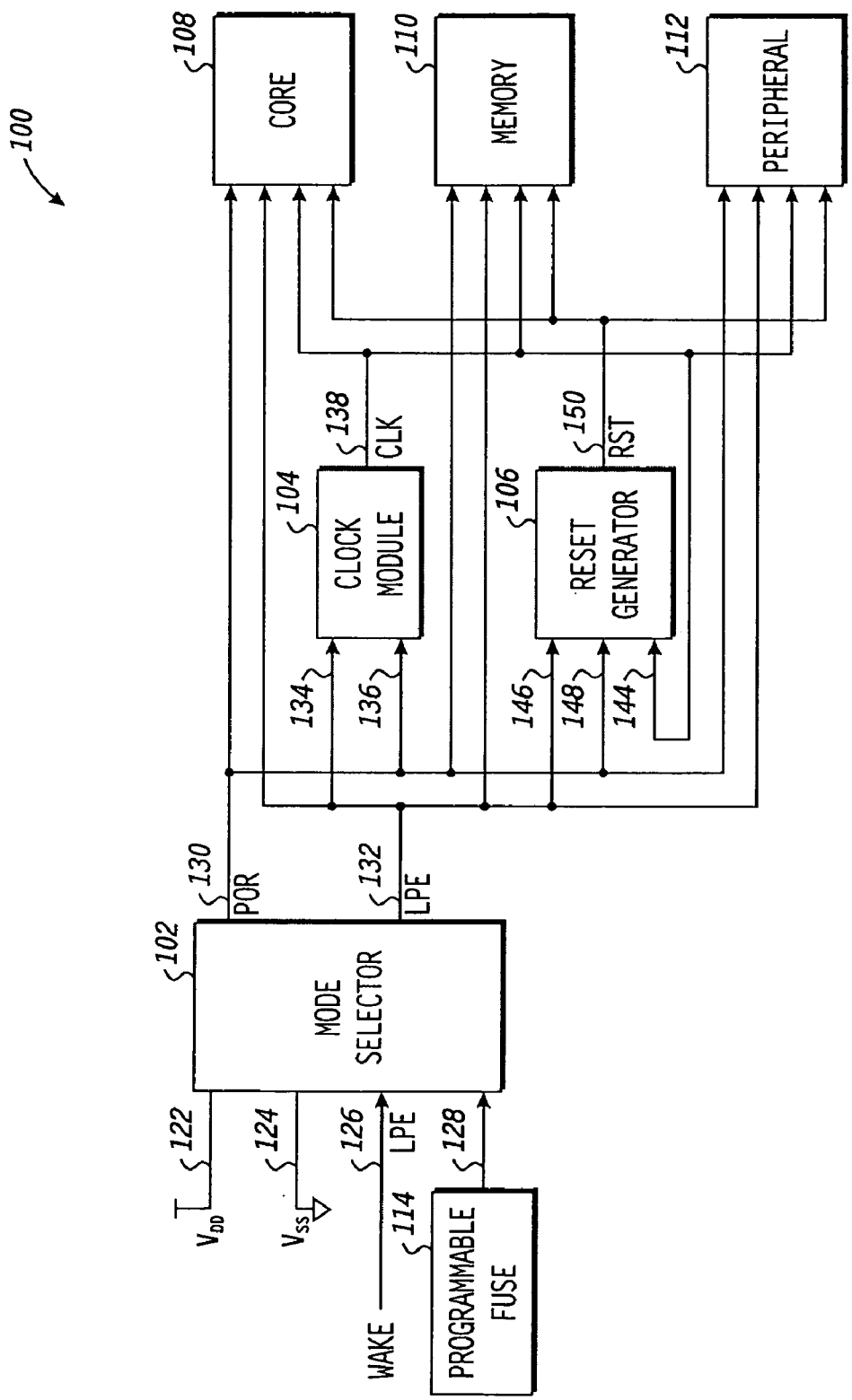
FIG. 1 is a block diagram illustrating an exemplary processing device utilizing a delayed entry into an operational mode in accordance with at least one embodiment of the present disclosure.

In accordance with one aspect of the present disclosure, a method includes asynchronously entering a first mode at a processing device in response to an application of power at the processing device. The method further includes receiving a wake signal at the processing device subsequent to entering the first mode. The method additionally includes asynchronously entering a second mode from the first power mode at the processing device in response to receiving the wake signal. In one embodiment, a clock at the processing device is disabled in the first mode and enabled in the second mode.

In accordance with another aspect of the present disclosure, a method includes applying power at a master processing device and applying power at each of a plurality of slave processing devices. The method further includes asynchronously entering a low power mode at each slave processing device in response to the application of power at the slave processing device. The method additionally includes entering an operational mode at the master processing device in response to the application of power at the master processing device, wherein a clock at the master processing device is enabled during the operational mode. The method further includes providing a wake signal from the master processing device to each slave processing device of at least a subset of the plurality of slave processing devices subsequent to entering the operational mode at the master processing device. The method also includes asynchronously entering the operational mode from the low power mode at each slave processing device in response to receiving the wake signal at the slave processing device. In one embodiment, a clock at each slave processing device is disabled during the low power mode and is enabled during the operational mode.

In accordance with yet another aspect of the present disclosure, a system includes a processing device. The processing device includes a mode selector module having a first input to receive an indication of an application of power to the processing device, a second input to receive a wake signal, and an output to provide a low power enable signal. The mode selector module provides an asserted value for the low power enable signal representing an entry into a low power mode in response to the application of power and provides an unasserted value for the low power enable signal representing an entry into an operational mode in response to receiving the wake signal. The processing device further includes a clock module having an input to receive the low power enable signal, and an output to provide a clock signal when the low power enable signal includes an unasserted value and to provide a constant value when the low power enable signal comprises an asserted value.

FIGS. 1-4 illustrate exemplary techniques for delayed entry into an operational mode at a processing device. Upon application of power (e.g., by application of a supply voltage) at a processing device, the processing device enters a low power mode whereby internal clocks are disabled, along with some or all of the components of the processing device, so as to allow any potential contact bounce to substantially settle. Upon receipt of a wake signal, the processing device enters either a fully operational mode, or in certain instances, the processing device enters a reset mode. The wake signal may be provided from an external device, such as another processing device or a peripheral device, or the processing device may utilize an asynchronous technique, such as the discharging of a capacitor, as the trigger for the wake signal.

Referring to FIG. 1, an exemplary processing device 100 is illustrated in accordance with at least one embodiment of the present disclosure. The processing device 100 can include, for example, a microcontroller, a microprocessor, and the like. In the depicted example, the processing device 100 includes a mode selector module 102, a clock module 104, a reset generator module 106, a processor core 108, one or more memories 110 (e.g., a cache, a buffer, a random access memory (RAM), etc.), one or more peripherals 112 (e.g., a memory controller, a bus controller, an input/output interface, etc.), and a programmable fuse 114 to store a programmable value. The modules 102, 104 and 106, in one embodiment, are implemented as hardware, such as combinatorial logic, latches, gates, or combinations thereof. The modules 102, 104 and 106 alternately may be implemented as software, firmware, or combinations thereof.

The mode selector module 102 includes a voltage input 122 to receive a first voltage, a voltage input 124 to receive a second voltage (e.g., $V_{SS}$), a voltage input 126 to receive a value signal, a mode input 128 to receive a value (e.g., a binary value) from the programmable fuse 114, an output 130 to provide a power on reset (POR) signal, and an output 132 to provide a low power enable (LPE) signal. In one embodiment, the wake signal, POR signal, and LPE signals are implemented as binary signals whereby the corresponding signal is asserted when the signal has an identified value (e.g., a logic 1 or logic 0 value). The POR signal and the LPE signal are distributed to the components of the processing device 100, including the clock module 104, the reset generator module 106, the processing core 108, the memory 110, and the peripheral 112, via one or more interconnects or other busses.

The programmable fuse 114 may be used to enable or disable the low power mode feature described herein. To illustrate, in certain systems, such as those with a relatively slow clock or with a relatively substantial power supply, it may be advantageous to operate as with conventional schemes whereby the clock module 104 is permitted to provide a clock signal intermittently until contact bounce has subsided. In these instances, the programmable fuse 114 can be programmed to store a first value that directs the mode selector module 102 to select an operational mode without first entering the low power mode. In other instances, it may be desirable to conserve power or to facilitate continuous clock signaling and the programmable fuse 114 therefore can be programmed to store a second value that directs the mode selector module 102 to implement the low power mode described herein. It will be appreciated that other techniques for enabling or disabling the low power mode may be used without departing from the scope of the present disclosure. For example, one of two different metal masks may be used during manufacture of the processing device 100, where the use of one of the metal masks configures the processing device 100 to enable the low power mode and the user of the other metal mask configures the processing device 100 to disable the low power mode.

In the illustrated example, the clock module 104 has an input 134 coupled to the output 130 of the mode selector module 102 to receive the POR signal, an input 136 coupled to the output 132 of the mode selector 102 to receive the LPE signal, and an output 138 to provide a clock signal (CLK), whereby generation of the clock signal by the clock module 104 is enabled and disabled responsive to the POR signal and the LPE signal. In other embodiments, rather than generating the clock signal at the processing device 100, the clock module 104 receives a clock signal from a component external to the processing device 100 and provides a representation of the external clock signal as the clock signal (CLK) responsive to the POR signal and the LPE signal. In this instance, the clock module 104 can include, for example, a phase locked loop (PLL), a clock divider, a clock multiplier, or any combination thereof. The representation of the external clock signal therefore can include a synchronized clock signal having the same frequency, or a clock signal having a lower or higher frequency than the external clock signal. The clock signal output by the clock module 104 via output 138 is distributed to the other components of the processing device 100, whereby these components are operative based on whether the clock signal is enabled or disabled. To illustrate, the clock signal drives the operation of the processing core 108 and the peripherals 112, as well as controlling access to, and operation of the memory 110. Thus, when the clock signal is disabled (i.e., when the clock module 104 is disabled), the processing core 108, the embedded memory 110, the peripheral 112 and the reset generator module 106 enter low power states whereby power consumption is reduced compared to when the components are in their operative states.

The reset generator module 106 includes an input 144 to receive the clock signal, an input 146 to receive the POR signal and an input 148 to receive the LPE signal. The reset generator module 106 further includes an output 150 to provide a reset (RST) signal responsive to the clock signal, the POR signal and the LPE signal. The reset signal is distributed to the processing core 108, the embedded memory 110 and the peripheral 112 via an interconnect or other bus. The processing core 108, the embedded memory 110 and the peripheral 112 are operative to enter a reset state in response to an assertion of the reset signal.

Upon application of power by, for example, providing a voltage at the voltage inputs 122 and 124, the mode selector module 102 temporarily asserts the POR signal at the output 130, thereby signaling to the components of the processing device 100 that a power event has occurred. If the value stored in the programmable fuse 114 indicates that the low power mode is to be disabled, the mode selector 102 maintains the LPE signal in an unasserted state at the output 132 so that the components of the processing device 100 enter either a reset mode or an operational mode. Thus, in response to the asserted POR signal and the unasserted LPE signal the clock module 104 generates or otherwise provides the clock signal to the other components. Further, if the processing device 100 is to enter a reset mode, the reset generator module 106 asserts the reset signal at the output 140 in response to the asserted POR signal, the enabled clock signal, and the unasserted LPE signal.

Otherwise, if the value stored at the programmable fuse 114 indicates that the low power mode is enabled, the mode selector module 102 asserts the LPE signal at the output 132 in response to the application of the voltage. The asserted LPE signal disables the clock module 104 so that generation or transmission of the clock signal is disabled, by providing a constant value (e.g., logic zero) in place of an oscillating clock signal. Accordingly, as no clock signal is provided, the other components of the processing device 100 enter or remain in a low power state. Further, the reset generator module 106 maintains the reset signal in an unasserted state in response to the asserted LPE signal.

In at least one embodiment, the mode selector module 102 maintains the LPE signal in an asserted state (thereby maintaining the processing device 100 in a low power mode) until a wake signal (e.g., an asserted value) is received at the input 126. The wake signal can be provided by an external component, such as another processing device or peripheral device. To illustrate, the wake signal may include an interrupt from an external peripheral that indicates a request for a certain process to be performed by the processing device 100 (e.g., an interrupt from a keyboard indicating that a key has been pressed). Alternately, the wake signal can be provided in response to a lapse of a fixed duration of time after the initial application of power. In this instance, the fixed duration of time can represent the time needed for any potential contact bounce to sufficiently subside. Accordingly, the wake signal can be provided by an external component that utilizes a counter or other timer to identify when the wake signal is to be asserted based on an expected contact bounce settling period. Alternately, the processing device 100 or another component can utilize, for example, the discharging of a capacitor to determine when to assert the wake signal so that the contact bounce has sufficiently subsided.

In response to the asserted wake signal, the mode selector module 102 initiates the entry of the processing device 100 to an operational mode by deasserting the LPE signal at the output 132. The clock module 104, in response to the unasserted LPE signal, begins generating or otherwise providing an enabled clock signal to the other components of the processing device 100, thereby enabling their operation. In instances wherein a reset period is implemented, the reset generator module 106 asserts the reset signal at the output 150 so as to direct the components to enter into a reset mode and maintains the reset signal in an asserted state for a predetermined number of clock cycles. After the reset signal returns to an unasserted state, the components enter a fully operational state.

Figure 2:
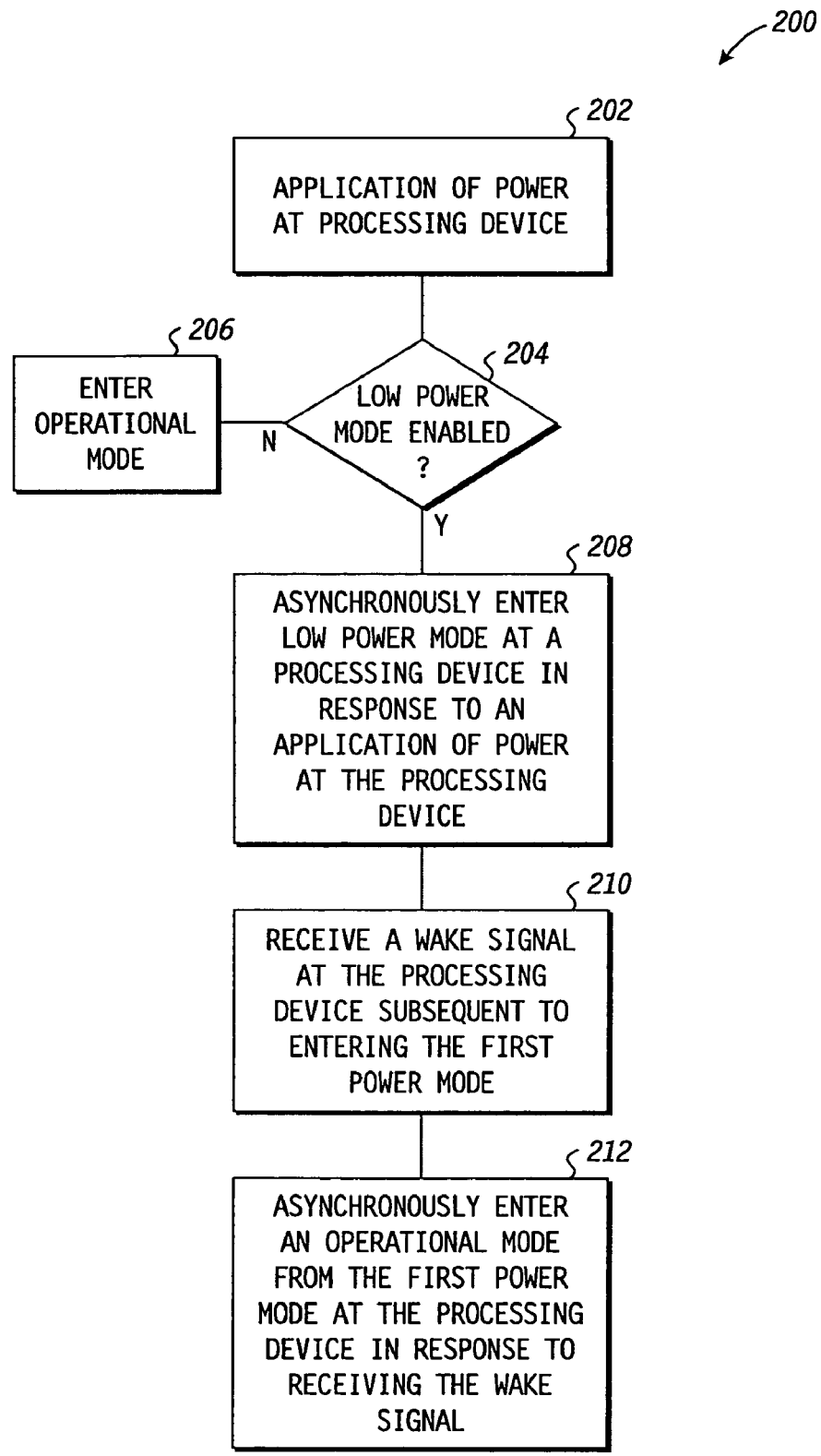
FIG. 2 is a flow diagram illustrating an exemplary method for operating a processing device upon application of power in accordance with at least one embodiment of the present disclosure.

Referring to FIG. 2, an exemplary method 200 for asynchronously entering a low power state upon application of power at a processing device is illustrated in accordance with at least one embodiment of the present disclosure. At block 202, the method 200 includes applying power to a processing device. As noted above, the application of power can include providing a supply voltage to one or more voltage pins of the processing device. At block 204, the processing device determines whether a low power mode is enabled. As discussed with reference to FIG. 1, a programmable fuse or other configurable feature may be used to enable or disable the low power mode for the processing device. In the event that the low power mode is disabled, the method 200 flows to block 206, whereby the processing device enters an operational mode, such as a fully operational mode or a reset mode. In the operational mode, an enabled clock signal is provided to the components of the processing device.

In the event that the low power mode is enabled, the method 200 flows to block 208, whereby the processing device asynchronously enters a low power mode in response to the application of power at the processing device. While the processing device is in the low power mode, one or more clock signals of the processing device are disabled, thereby causing the components of the processing device to become inactive. As discussed herein, the clock signals of the processing device can be disabled by disabling a clock signal generation in the event that the clock signals are generated at the processing device, or by preventing the distribution of a clock received at the processing device from an external source.

At block 210, the method 200 includes receiving a wake signal at the processing device subsequent to entering the low power mode. The wake signal can include, for example, a signal from a device external to the processing device, such as an interrupt from an external peripheral. The wake signal alternately can include a signal from a counter or other timing feature that indicates that a certain amount of time has lapsed from when power was applied to the processing device.

At block 212, the method 200 includes the processing device asynchronously entering an operational mode from the low power mode in response to receiving the wake signal. The operational mode can include a fully operational mode or a reset mode. While the processing device is in the operational mode, one or more clock signals are enabled, thereby permitting operation of various components of the processing device. The clock signals may be enabled by enabling clock generation at the processing device or by enabling the internal distribution of a clock signal received from another device.

Figure 3:
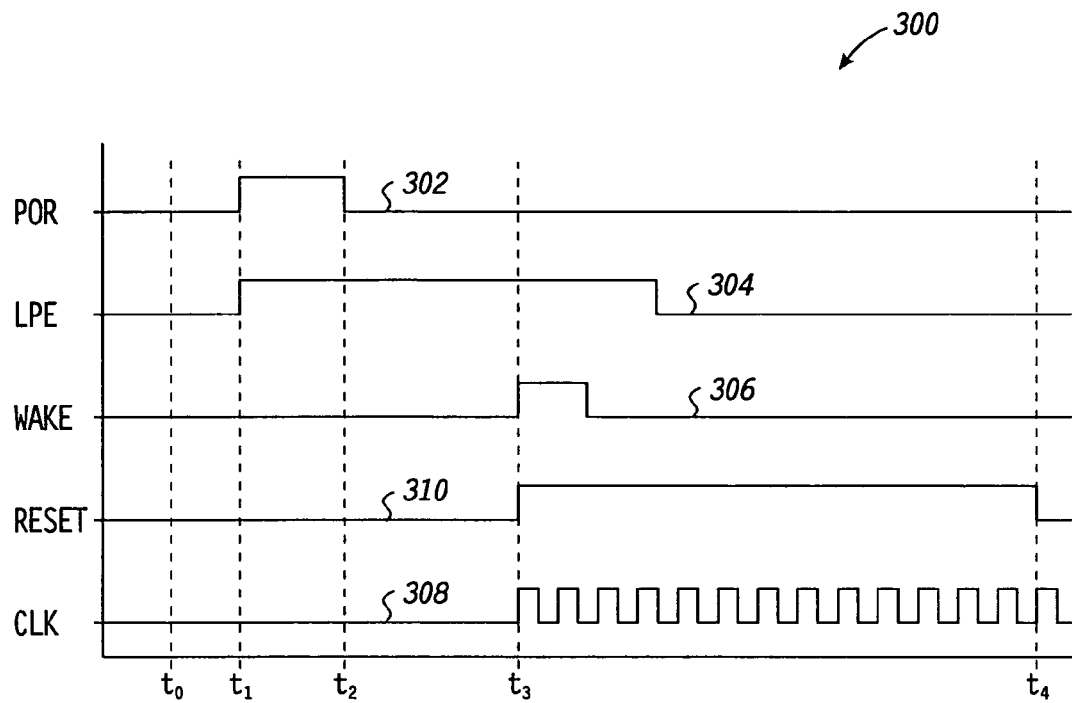
FIG. 3 is a timing diagram illustrating an exemplary operation of a processing device in accordance with at least one embodiment of the present disclosure.

Referring to FIG. 3, an exemplary timing diagram 300 depicting an operation of the processing device 100 of FIG. 1 is illustrated in accordance with at least one embodiment of the present disclosure. The timing diagram 300 includes a POR signal 302, a LPE signal 304, a wake signal 306 and a clock signal 308. The timing diagram 300 also includes the reset signal 310 in implementations utilizing a reset mode. For ease of discussion, logic delays are assumed to be negligible.

At time $t_0$, power is initially applied to the processing device 100. In response, the POR signal 302 is asserted at time $t_1$ and remains asserted until time $t_2$. Also in response to the application of power, the LPE signal 304 is asserted at time $t_1$ and remains asserted until the wake signal 306 is asserted at time $t_3$. For the duration between time $t_1$ and $t_3$ the clock signal 308 is disabled (i.e., is a constant value of logic zero) due to the assertion of the LPE signal 304. In response to the LPE signal 304 returning to an unasserted state at time $t_3$, the clock signal 308 is enabled. In instances wherein a reset mode is utilized, the reset signal 310 is asserted at time $t_3$ in response to the deassertion of the wake signal 306 and remains asserted until time $t_4$ so as to facilitate a reset period at the processing device 100. As the timing diagram 300 illustrates, the delayed entry of the processing device into an operational mode can reduce spurious operation and excessive power draw by allowing any contact bounce to sufficiently subside during the period between $t_0$ (i.e., the application of power) and time $t_3$ (i.e., the entry into an operational mode).

Figure 4:
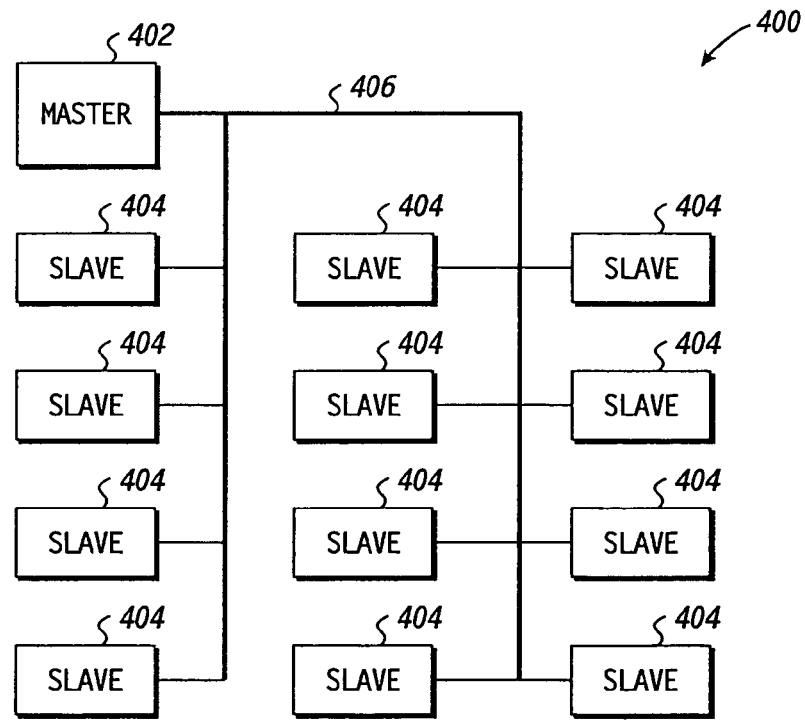
FIG. 4 is a block diagram illustrating a system having multiple processing devices in accordance with at least one embodiment of the present disclosure.

Referring to FIG. 4, an exemplary system 400 utilizing multiple processing devices is illustrated in accordance with at least one embodiment of the present disclosure. In the depicted example, the system 400 includes a master processing device 402 coupled to a plurality of slave processing devices 404 via one or more buses 406. Some or all of the slave processing devices 404 are configured to implement the low power mode as described above with reference to FIGS. 1-3.

In operation, the master processing device 402 is configured to control the modes of the slave processing devices 404. Upon application of power to the master processing device 402, a counter or other timer is started. Upon application of power to the slave processing devices 404, each slave processing device 404 enters a low power mode as described above. Upon expiry of the counter, the master processing device 402 provides a wake signal to at least a subset of the slave processing devices 404 to direct the subset to enter an operational mode from the low power mode. In response to receiving the wake signal, each slave processing device 404 enables its internal clock signals, thereby allowing its components to enter a reset mode or a fully operation mode. Alternately, rather than using a timer, the master processing device 402 may be configured to provide the wake signal to a subset of the slave processing devices 404 in response to a certain event, such as receiving an interrupt, or based on a predefined control setting that indicates which of the slave processing devices 404 are to be in operational modes during certain periods or at certain times.

In at least one embodiment, the master processing device 402 can control the sequence in which the slave processing devices 404 enter an operational mode from the low power mode. To illustrate, in order to modulate the power consumed by the system 400 during start-up, the master processing device 402 can activate the slave processing devices 404 sequentially by providing the wake signal to each slave processing device 404 in sequence. In an alternate embodiment, the master processing device 402 can activate the slave processing devices 404 substantially in parallel by providing the wake signal to each slave processing device 404 substantially simultaneously.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   asynchronously entering a first mode at a processing device in response to an application of power at the processing device, wherein a clock at the processing device is disabled during the first mode;
   receiving a wake signal at the processing device subsequent to entering the first mode, wherein the wake signal is provided by another processing device in response to a laps of a fixed duration after an application of power at the other processing device; and
   asynchronously entering a second mode from the first mode at the processing device in response to receiving the wake signal, wherein the clock at the processing device is enabled in the second mode.

2. The method of claim 1, wherein the application of power comprises an application of supply voltage at the processing device.

3. The method of claim 1, wherein the first mode comprises a low power mode wherein at least one component of the processing device other than the clock is disabled.

4. The method of claim 3, wherein asynchronously entering the second mode comprises enabling the clock in response to receiving the wake signal.

5. The method of claim 4, wherein:
   the clock comprises a clock generated at the processing device; and
   enabling the clock comprises enabling generation of the clock at the processing device.

6. The method of claim 4, wherein:
   the clock comprises a clock received at the processing device from a clock source external to the processing device; and
   enabling the clock comprises providing a representation of the clock received at the processing device to components of the processing device.

7. The method of claim 1, further comprising:
   receiving a programmable value indicating whether the first mode is enabled;
   wherein the first mode is asynchronously entered responsive to the programmable value indicating that the first mode is enabled; and
   wherein the second mode is entered responsive to the programmable value indicating that the second mode is enabled.

8. A method comprising:
   applying power at a master processing device;
   applying power at each of a plurality of slave processing devices;
   asynchronously entering a low power mode at each slave processing device in response to the application of power at the slave processing device, wherein a clock at each slave processing device is disabled during the low power mode;
   entering an operational mode at the master processing device in response to the application of power at the master processing device, wherein a clock at the master processing device is enabled during the operational mode;
   providing a wake signal from the master processing device to each slave processing device of at least a subset of the plurality of slave processing devices subsequent to entering the operational mode at the master processing device; and
   asynchronously entering an operational mode from the low power mode at each slave processing device in response to receiving the wake signal at the slave processing device, wherein the clock at each slave processing device is enabled during the operational mode.

9. The method of claim 8, wherein asynchronously entering the low power mode at each slave processing device comprises disabling the clock at the slave processing device in response the application of power at the slave processing device.

10. The method of claim 8, wherein asynchronously entering the operational mode at each slave processing device comprises enabling the clock at the slave processing device in response to receiving the wake signal.

11. The method of claim 8, further comprising:
    providing, from the master processing device, the wake signal to each slave processing device of the subset.

12. The method of claim 11, wherein the master processing device provides the wake signal in response to a lapse of a fixed duration after the application of power at the master processing device.

13. The method of claim 12, wherein the fixed duration is representative of a contact bounce settling period.

14. The method of claim 8, wherein the wake signal is provided to the slave processing devices substantially simultaneously.

15. The method of claim 8, wherein the wake signal is provided to the slave processing devices sequentially.

16. A system comprising:
    a first processing device comprising:
       a mode selector module having a first input to receive an indication of an application of power to the first processing device, a second input to receive a wake signal, and an output to provide a low power enable signal, wherein the mode selector module provides an asserted value for the low power enable signal representing an entry into a low power mode in response to the application of power and provides an unasserted value for the low power enable signal representing an entry into an operational mode in response to receiving the wake signal; and
       a clock module having an input to receive the low power enable signal, and an output to provide a clock signal when the low power enable signal comprises an unasserted value and to provide a constant value when the low power enable signal comprises an asserted value; and
    a second processing device to provide the wake signal at an output of the second processing device in response to a lapse of a fixed duration after an application of power at the second processing device.

17. The system of claim 16, wherein the first processing device further comprises a component having an input operably coupled to the output of the clock module, wherein the component is operative based on the output of the clock module.

18. The system of claim 16, wherein the mode selector module further comprises a third input to receive a programmable value indicating whether the low power mode is enabled.

* * * * *

UNITED STATES PATENT AND TRADEMARK OFFICE
CERTIFICATE OF CORRECTION

| | | |
|---|---|---|
| PATENT NO. | : 7,653,822 B2 | |
| APPLICATION NO. | : 11/377993 | |
| DATED | : January 26, 2010 | |
| INVENTOR(S) | : Jeffrey S. Schaver | |

It is certified that error appears in the above-identified patent and that said Letters Patent is hereby corrected as shown below:

Column 7, Line 9, please change "during the first mode" to --for the duration of the first mode--

Column 7, Line 13, please change "laps" to --lapse--

Signed and Sealed this
Tenth Day of July, 2012

David J. Kappos
*Director of the United States Patent and Trademark Office*